US006812189B1

(12) United States Patent
Vierheilig et al.

(10) Patent No.: US 6,812,189 B1
(45) Date of Patent: Nov. 2, 2004

(54) ATTRITION RESISTANT, ZINC TITANATE-CONTAINING, REDUCED SULFUR SORBENTS

(75) Inventors: Albert A. Vierheilig, Savannah, GA (US); Raghubir P. Gupta, Durham, NC (US); Brian S. Turk, Durham, NC (US)

(73) Assignees: Research Triangle Institute, Research Triangle Park, NC (US); Intercat, Inc., Sea Girt, NJ (US)

( * ) Notice: Subject to any disclaimer, the term of this patent is extended or adjusted under 35 U.S.C. 154(b) by 0 days.

(21) Appl. No.: 09/541,204

(22) Filed: Apr. 3, 2000

Related U.S. Application Data

(63) Continuation of application No. 09/256,621, filed on Feb. 23, 1999, now abandoned.
(60) Provisional application No. 60/075,680, filed on Feb. 24, 1998.

(51) Int. Cl.[7] .................................................. B01J 20/02
(52) U.S. Cl. ........................ 502/414; 502/504; 502/517
(58) Field of Search ................................. 502/400, 414, 502/501, 504, 514, 517, 439

(56) References Cited

U.S. PATENT DOCUMENTS

| 4,088,736 | A | * | 5/1978 | Courty et al. ............... 423/230 |
| 4,263,020 | A | * | 4/1981 | Eberly, Jr. ...................... 55/62 |
| 4,425,312 | A | * | 1/1984 | Brignac ....................... 423/230 |
| 4,990,318 | A | * | 2/1991 | Kidd ........................... 423/230 |
| 5,254,516 | A | * | 10/1993 | Gupta et al. ................... 502/84 |

FOREIGN PATENT DOCUMENTS

| WO | WO 99/42201 | * | 8/1999 |

* cited by examiner

Primary Examiner—Wayne A. Langel
(74) Attorney, Agent, or Firm—Oblon, Spivak, McClelland, Maier & Neustadt, P.C.

(57) ABSTRACT

The disclosure is directed to sorbent compositions for removing reduced sulfur species (e.g., $H_2S$, COS and $CS_2$) a feed stream. The sorbent is formed from a multi-phase composition including a zinc titanate phase and a zinc oxide-aluminate phase. The sorbent composition is substantially free of unreacted alumina.

30 Claims, 5 Drawing Sheets

TGA PICKUP OF $H_2S$ GAS FOR ZINC TITANATE SORBENT SUPPORTED ON ZINC ALUMINATE.

TGA PICKUP OF H₂S GAS FOR ZINC TITANATE SORBENT SUPPORTED ON ALUMINA.

TGA PICKUP OF H$_2$S GAS FOR ZINC TITANATE SORBENT SUPPORTED ON ZINC ALUMINATE.

ATTRITION RESISTANT, ZINC TITANATE-CONTAINING, REDUCED SULFUR SORBENTS

CROSS REFERENCE TO RELATED APPLICATIONS

This application is a continuation of U.S. Provisional Application No. 60/075,680 filed Feb. 24, 1998, and a continuation of U.S. patent application Ser. No. 09/256,621, filed Feb. 23, 1999 now abandoned.

This invention also was made with United States Government support under Grant number DE-FG02-96ER82189 awarded by the Department of Energy. Consequently, the United States Government has certain rights in this invention.

BACKGROUND OF THE INVENTION

1. Field of the Invention

This invention generally relates to zinc titanate-containing compositions used to remove reduced sulfur gases such as $H_2S$, COS, and $CS_2$ from gas streams. More specifically, it relates to those zinc titanate-containing compositions that, aside from their chemical reactivity toward reduced sulfur gases, also have she physical attributes of toughness and attrition resistance.

2. Background of the Invention

Reduced sulfur gases are present in many industrial processes. For example, reduced sulfur gases are found in flue gas, coal gas and fuel gas streams. They are also found in industrial product gas streams such as olefin-containing gas streams which are a component of petroleum refining operations. These gases are often removed from such gas streams by vise of various metal oxides that have the ability to capture a reduced sulfur-containing gas component from such gas streams. In order to capture such a gas from certain industrial processes (such as packed-bed, fluidized-bed or moving-bed reactors) the metal oxide, reduced sulfur gas sorbent materials must be used in forms which are mechanically strong and resistant to attrition. Otherwise, problems such as pressure drops through a process reactor unit, particulate matter elutriation and/or clogging of valves or other mechanical components will take place.

Moreover, almost all industrial processes that deal with reduced sulfur gases also are confronted with the problem of desorbing these gases from the metal oxide sorbent material so that said sorbent material can be used over and over again in order to obtain its maximum economic benefit. Other problems associated with the presence of reduced sulfur gases (such as $H_2S$, COS and $CS_2$) in gas streams such as fuel gases, flue gases and waste gases arise from the fact that reduced sulfur gases are corrosive toward ferrous metals. They are especially corrosive toward steel turbine blades. Therefore, the presence of reduced sulfur gases in those hot fuel cases used to power turbines results in their severe corrosion. Oxidation of hot fuel gases also serves to oxidize any reduced sulfur gases contained therein. The resulting sulfur oxide gases (e.g., $SO_2$ and $SO_3$ which are commonly referred to as "$SOX_x$" gases) also are highly corrosive toward ferrous metals. Moreover, upon release to the atmosphere, $SO_x$ gases form so-called "acid-rain." Therefore, the concentration of reduced sulfur gases contained in those hot fuel gases introduced into power producing equipment such as turbines and fuel cells must be brought to very low concentrations, e.g., a is few parts per million (ppm), before they are combusted in equipment of this kind.

Next, it should be noted that, in the case of sulfur oxide sorbents—as opposed to the reduced sulfur sorbents that form the subject matter of this patent disclosure—the subject sulfur oxide is normally usually captured in an oxidizing atmosphere such as those extant in the catalyst regenerator of a FCC unit. This is done through use of various metal oxide particles having an affinity for a given sulfur oxide-containing gas. These particles are often entrained in a "fluidized" process. For example, sulfur oxide (e.g., $SO_2$ or $SO_3$) sorption is often carried out through use of fluidized microspheroidal magnesium-containing particles that can withstand the hot (e.g., 1350° F.) oxidizing conditions present in the catalyst regenerator units of those fluid catalytic conversion ("FCC") processes used to refine petroleum. Conversely, release of such sorbed sulfur-containing gases usually occurs in the reducing environment of a FCC reactor. The sulfur component of such gases is released as hydrogen sulfide $H_2S$. This released $H_2S$ gas is readily captured downstream of the reactor and normally does not create an environmental hazard.

Again, however, the processes of the present patent disclosure are different from such So, sorption processes in that applicant's compositions are specifically designed to capture chemically reduced forms of sulfur (e.g., those in $H_2S$, COS and $CS_2$) rather than chemically oxidized forms of sulfur (e.g., those in $SO_2$ and $S_3O$). Thus, applicant's capture of reduced sulfur gases must take place under chemical reduction conditions, rather than under chemical oxidizing conditions.

Many different zinc—containing compounds have been used in both fixed bed and fluid bed systems in order to remove one or more species of reduced sulfur gases from various industrial gas streams (e.g., fuel gases, such as those derived from the gasification of coal, flue or waste gases and/or industrial product gases such as those that contaminate olefin-type gases). Such zinc—containing compounds have included zinc oxide, zinc titanate and zinc aluminate. Zinc oxide, for example, has been used as a sorbent for selectively removing hydrogen sulfide gas. $H_2S$, from certain industrial gas streams. This metal oxide is normally used by placing it in contact with a hydrogen sulfide-containing gas stream at elevated temperatures. Zinc oxide, in and of itself, has not, however, proven to be a particularly effective hydrogen sulfide sorbent for many industrial applications. For example, its hydrogen sulfide sorption ability is relatively limited, especially at lower temperatures. It also suffers from the drawback of not being easily regenerated. This drawback follows from the relatively high thermodynamic stability of the zinc sulfide product of zinc oxide-hydrogen sulfide reactions. Zinc oxide also lacks the qualities of hardness, toughness and/or attrition resistance that are needed for many industrial applications.

Regeneration of the zinc sulfide product of zinc oxide-hydrogen sulfide reactions requires subsequent oxidation of the sulfur component of the zinc sulfide reaction product. This must be done at relatively high temperatures (e.g., 900° F. to 1500° F.). Unfortunately, the relatively high temperatures needed to oxidize zinc sulfide back to zinc oxide also tend to degrade the already inherently low mechanical strength and/or toughness of these zinc oxide-based materials. Consequently, zinc oxide sorbents tend to quickly disintegrate hen they are repeatedly used and regenerated.

Therefore, in order for zinc oxide-containing compounds to be effectively used in the harsh environments where they are needed (e.g., in the high temperature/high velocity particle impact environments of fluid, fixed or bubbling bed processes), they must be combined with other tougher and more attrition resistant metal oxide components in order to produce overall zinc oxide/metal oxide compositions having the requisite mechanical strength, hardness, durability, toughness and attrition resistance that they will need to function as reduced sulfur gas sorbents.

Generally speaking, this has been accomplished by mixing certain prescribed proportions of a relatively soft zinc oxide component with certain prescribed portions of another, relatively harder, tougher, metal oxide component in the same particle. The most effective and widely used metal oxide used for this hardening/toughening purpose has been unreacted alumina ($Al_2O_3$). Such use of alumina as a catalyst support for zinc oxide sorbents follows from the unusually high degree of hardness this material imparts to such compositions—as well as from the excellent binding capabilities of many forms of so-called "gelling" or "sol" alumina forms. Examples of such aluminas are the various grades of VISTA CATAPAL and CONDEA DISPERSAL aluminas. Such aluminas have been used in producing relatively harder, tougher and more attrition resistant extrudate, granule, microsphere, powder, particle, pellet, bead, etc. forms of zinc oxide/unreacted alumina compositions.

Many of the above-noted improvements in the sorption, regeneration and physical attributes of zinc oxide-containing compositions are taught in the patent literature. For example, U.S. Pat. No. 4,088,736 ("the '736 patent") discloses a reduced sulfur sorbent comprised of homogenous mixtures of zinc oxide, alumina, silica, and Group II-A metal oxide (s). The alumina and silica components of the compositions taught by the '736 patent serve to impart toughness and attrition resistance to the therein disclosed compositions.

Other patent disclosures teach the use of other zinc-containing compounds—that is to say, other than zinc oxide—as the "active," reduced sulfur gas-capturing agent in such compositions. For example, U.S. Pat. No. 4,263,020 ("the '020 patent") discloses the reduced sulfur gas-capturing abilities of metal aluminate spinels having the general formula $MAl_2O_4$ wherein the M component can be chromium, iron, cobalt, nickel, copper, cadmium or mercury. Zinc aluminate spinel, $ZnAl_2O_4$ is a particularly preferred member of this group of compounds. The '020 patent also notes that the zinc atoms of such a zinc aluminate spinel form simple adsorption bonds with reduced sulfur gases. These adsorption bonds are sufficient to remove a reduced sulfur gas, such as hydrogen sulfide, from a recycle hydrogen gas stream. The '020 patent also emphasizes that, unlike the chemical mechanism involved in the removal of reduced sulfur gas (e.g., hydrogen sulfide) from a recycle hydrogen gas stream by the use of zinc oxide-based sorbents, here is no chemical reacting in the process of the '020 patent wherein zinc sulfide is ever formed from these $MAl_2O_4$ compounds. Consequently, they can be regenerated by simply purging or sweeping the physically sorbed, reduced sulfur gas from these $MAl_2O_4$ compounds with a hot, inert gas such as nitrogen.

Zinc titanate has also been used as a reduced sulfur compound sorbent. Indeed, it has been used in sorbents having no binder component other than the zinc titanate itself. Unfortunately, zinc titanate (like zinc oxide) also suffers to some degree from the drawback of being a relatively "soft" material. Consequently, most zinc titanate-containing compositions (like zinc oxide-containing compositions) employ an unreacted alumina component as a binder material in order to create hard, tough, attrition resistant zinc titanate/unreacted alumina compositions.

Still other zinc titanate-containing, reduced sulfur sorbent compositions do not employ unreacted alumina, but rather employ other kinds of toughness-imparting binder materials. For instance, U.S. Pat. No. 5,254,516 ("the '516 patent") teaches various zinc titanate-based sorbent materials that further comprise a combination of inorganic and organic materials that are used as a binder for the active zinc titanate ingredient. These inorganic binder materials include clays such as kaolinite and bentonite (which are aluminosilicates), feldspar, sodium silicate, forsterite and calcium sulfate. The more preferred organic binders used to create the tough binder materials disclosed in the '516 patent are methylcellulose-based compositions such as that commercially available as METHOCEL.

Those skilled in this art also will appreciate that zinc titanate-containing compositions tend to lose more and more of their capacity to absorb reduced sulfur gases as more and more of the binder ingredients (e.g. clay, alumina, organics, etc.) are used in these compositions. It might also be noted in passing here that it was heretofore generally believed that the reason for this loss in reduced sulfur gas capturing ability was simply due to the fact that less zinc titanate is present in those compositions having relatively greater proportions of binder materials.

Applicant has, however, learned that the above noted reduced sulfur-capturing capacity is only partially due to the reduced concentrations of such sulfur sorbent materials. Indeed, applicant has established that the reduction of sulfur sorbing capacities in such materials is largely caused by certain adverse chemical interaction between the zinc titanate and the other components of the sorbent particle (such as their binder and filler ingredients). Applicant has also discovered the most undesirable of these reactions is one that occurs between zinc titanate and unreacted alumina. That is to say that even though certain metal oxides, and especially unreacted alumina, have proven to be especially effective binders for zinc titanate-based compositions because they serve to greatly improve the mechanical strength and attrition resistance of the resulting zinc titanate/unreacted alumina particles, applicant has found that such use of unreacted alumina results in overall reduced sulfur gas sorbent compositions that exhibit progressively lower reduced sulfur gas capturing activity—not only because more and more unreacted aluminum-containing compounds (such as alumina, clay, etc.) are added to these compositions in order to make them harder, tougher and more attrition resistant—but because some of the aluminum component of she unreacted alumina has chemically reacted by some of the zinc component of the zinc titanate.

In other words, applicant has found the reason behind the fact that, despite the improvements in the physical attributes of zinc titanate-containing particles in general, and especially these brought about by use of "optimal" proportions of unreacted alumina binders, prior art reduced sulfur sorbent compositions are characterized by the fact that they, all too soon, lose their reduced sulfur-containing gas sorbent ability and/or their physical integrity, as they are repeatedly used, regenerated and reused. Armed with this understanding, applicant has produced reduced sulfur gas sorbents that are characterized by their relatively better reduced sulfur gas sorbent abilities and physical hardness, toughness, durability and/or attrition resistance qualities. It is therefore an object of the present invention to describe certain reduced sulfur sorbent compositions that are simultaneously capable of readily reversibly sorbing, and releasing, relatively large amounts of reduced sulfur gas without losing their sulfur sorbing ability and/or quickly succumbing to the harsh conditions where these particles are employed.

Indeed, applicant's reduced sulfur gas sorbent compositions even tend to gain in their reduced sulfur gas sorbent abilities as they are repeatedly used over many successive sorption and regeneration cycles. Hence, the reduced sulfur sorbent compositions of this patent disclosure are especially well suited for use in a wide variety of production and/or pollution control process streams (e.g., removing a reduced sulfur gas from a hydrocarbon stream, e.g., removing $H_2S$ from an olefin stream, removing reduced sulfur gases from flue gases, etc., removing sulfur from coal gases before they are introduced into a turbine, etc.). Applicant's compositions are especially useful in those bubbling and fluid bed processes wherein the mechanical stresses imparted to particles of such reduced sulfur sorbents compositions are severe, and, if not in some way guarded against, would result in high elutriation losses from any process employing these compositions under such adverse conditions.

In summary, the :ore desirable properties of the reduced sulfur sorbents taught by this patent disclosure include their improved (1) hardness, toughness and attrition resistance, (2) ability to capture reduced sulfur gases such as $H_2S$) from a variety of gaseous streams, (3) ability to release the sorbed sulfur species, (4) ability to minimize sorbent deactivation over relatively more cycles of sorbing and releasing Various reduced sulfur species, (5) ability to form into special shapes (i.e. microspheroidal particles) that are particularly useful for certain applications, (6) ability to remove reduced sulfur gases from a stream of a commercially valuable gas product (e.g., remove $H_2S$ from an olefin stream) and (7) special suitability for capturing reduced sulfur gases from hot fuel gas streams such as those used to power turbines and fuel cells (e.g., removing reduced sulfur gas from a coal gas stream before it is introduced into a turbine).

SUMMARY OF THE INVENTION

Applicant's experimental work has established that the loss of activity of zinc titanate/unreacted alumina compositions with respect to their ability to pick-up reduced sulfur gases is due, in large measure, to formation of a zinc aluminate phase in such compositions during their use in high temperature environments (e.g. those higher than about 500° F.). This zinc aluminate phase forms from the zinc component of the zinc titanate active ingredient and from the aluminum component of those unreacted alumina ingredient (s) normally used as binder ingredients for the zinc titanate in most prior art reduced sulfur sorbent compositions. Applicant also has found that this zinc aluminate phase is not normally formed under the sorption cycle in which the chemically reduced sulfur gas is sorbed, but rather is, for the most part, formed during the subsequent relatively higher temperature, regeneration cycle wherein the sorbed, reduced sulfur gases are driven off the composition so that it can be reused over and over again.

Applicant also found that this zinc aluminate forming chemical reaction is virtually irreversible under the catalyst regeneration temperature conditions that exist in most processes wherein such zinc titanate/unreacted alumina compositions are employed. In effect, this loss of activity toward reduced sulfur gases follows from the fact that the newly formed zinc aluminate phase possesses significantly lower reduced sulfur gas capturing ability relative to that of the original zinc titanate ingredient of such compositions. Indeed, applicant's experimental work indicates that the reduced sulfur gas activity of this zinc aluminate phase is often as much as an order of magnitude less than that of the original zinc titanate ingredient. In other words, this newly formed zinc aluminate phase can be thought of as "poisoning" the sulfur sorbing zinc titanate ingredient of such zinc titanate-containing compositions. Worse yet, this poisoning effect becomes more and more pronounced as these compositions experience repeated sorption/regeneration cycles.

Thus, this invention is particularly concerned with preventing degradation of the active, reduced sulfur gas capturing, zinc titanate phase in those zinc titanate-containing reduced sulfur gas sorbent compositions that also employ aluminum ingredients (e.g., alumina-based ingredients) in order to give such compositions the hardness, toughness and attrition resistant qualities they need to survive in the harsh environments where they are employed. Applicant's invention also may be considered as teaching a method of producing attrition resistant zinc titanate-containing compositions (e.g., microspheroidal particles) by using a metal oxide-aluminate phase to support (bind, etc.) the active zinc titanate phase—as opposed to using an unreacted alumina phase for this support (binding, etc.) function.

The improved reduced sulfur gas capturing ability and desired physical characteristics of applicant's compositions are simultaneously achieved by chemically incorporating another metal-containing compound into an aluminum-containing binder component—and especially into an unreacted alumina binder component—of an overall zinc titanate/metal oxide-aluminate phase composition. That is to say that a chemical reaction is produced between at least a portion of an aluminum-containing component (such as unreacted alumina) and a metal-oxide containing compound (such as magnesium oxide) so that a resulting metal oxide-aluminate phase (e.g., $MgO.Al_2O_3$) will not thereafter chemically react with any zinc oxide driven off the zinc titanate component during regeneration of these sulfur sorbents at those elevated temperatures (e.g., those greater than about 700° F.) at which these sulfur sorbents are normally regenerated.

In other words, the metal oxide component of applicant's metal oxide-aluminate phase ingredient is further characterized by the fact that it is, to some degree, already chemically reacted with an aluminum-containing compound such as unreacted alumina when the sulfur sorbent experiences the high temperatures at which these sulfur sorbents are regenerated. Applicant will emphasize that this binder component of these overall compositions is not merely a mixture of the metal oxide (e.g., MgO) and unreacted alumina ($Al_2O_3$), but rather is a compound formed from these chemicals, through applicant's use of the expression "metal oxide-aluminate phase". That these chemical reactions have, in fact, occurred can be verified in several ways. For example, the XRD pattern for the resulting metal oxide-aluminate phase will differ from the XRD pattern of the subject metal oxide compound (e.g., MgO) itself, as well as from the XRD pattern of the subject unreacted aluminum-containing compound (e.g., $Al_2O_3$) itself. For example, if the metal oxide is magnesium oxide (MgO) and the unreacted aluminum-containing compound is alumina ($Al_2O_3$), the XRD pattern of applicant's resulting metal oxide-aluminate ($MgO.Al_2O_3$) phase will differ from that of the metal oxide (MgO) and from that of the unreacted alumina ($Al_2O_3$) Thus, applicant's overall zinc titanate/metal oxide-aluminate phase composition may be thought of as a zinc titanate phase that is combined, mixed, associated, etc. with a metal oxide-aluminate phase in the same particle. Again, the object of applicant's processes is to prevent chemical reactions between the zinc component of a zinc titanate and the aluminum component of the unreacted alumina ($Al_2O_3$) under those high temperature conditions where reduced sulfur gas sorbents are employed. Applicant's reduced sulfur gas sorbent composition also may contain certain optional Ingredients hereinafter more fully described.

Next, it should be noted that an excess metal oxide phase or an excess alumna phase may be present in applicant's overall reduced sulfur gas sorbent compositions (that is to say that complete chemical reaction between all of applicant's aluminum-containing compound (e.g. unreacted alumina) and all of applicant's metal oxide (e.g. MgO, ZnO, etc.) is not necessary for effective formulation of the overall compositions that constitute the subject matter of this patent disclosure. Complete chemical reaction between these metal oxide and alumina ingredients may, however, in many cases, be preferred.

Examples of the metal oxide-aluminate phases that can be used in applicant's sulfur sorbent compositions are varied and extensive. Indeed, such metal oxide-aluminate phases can be made with any metal or metal compound (e.g., a metal oxide) that can, to some extent, chemically react with alumina. These metals may include, but are not limited to, $Mg^{2+}$, $Ca^{2+}$, $Zn^{2+}$, $Ni^{2+}$. Bivalent metals are, however, particularly preferred for this purpose. The oxides of these metals (e.g. MgO, CaO, ZnO, NiO) as well as their nitrates, acetates, etc. forms can be used as starting materials for applicant's formulations. Those skilled in this art will, however, appreciate that the non-oxide forms of these metal compounds (e.g., their nitrates, acetates, etc.) will be converted to oxide forms, (e.g., MgO, CaO, ZnO, NiO, etc.) when these non-oxide metal compounds are subsequently subjected to certain high temperature processes (e.g., calcining) that may be used in the manufacture of these reduced sulfur gas sorbents—or which may be encountered (e.g., in high temperature regeneration units) during actual use of these sorbents.

Next, it should be noted that applicant also has found that, if the metal oxide-aluminate compound used in the processes of this patent disclosure is zinc aluminate, $ZnAl_2O_4$, the resulting zinc titanate/zinc oxide-aluminate composition is not poisoned by the original presence of the zinc aluminate. Applicant believes that this seemingly anomalous result follows from the fact that since the zinc aluminate phase, is already present in the zinc titanate-zinc aluminate sorbent particle, it prevents the zinc component of the zinc titanate from reacting with the aluminum component of the zinc aluminate. Consequently, following release of the sorbed sulfur species from such compositions, the zinc component of the zinc titanate compound again recombines with the titania to once again form zinc titanate which is again ready for reduced sulfur gas sorbing duty in a subsequent sorption cycle. In effect, this particular metal oxide-alumina chemical reaction produces a phase (a metal oxide-aluminate) that is not reactive toward the zinc titanate active ingredient.

Applicant's sulfur sorbent compositions will preferably contain, in the same particle, from about 5 to about 30 weight percent zinc titanate, and from about 20 to about 95 weight percent of the metal oxide-aluminate phase. The most preferred concentration will depend, in large part, on the particular end use intended. For instance, in those environments that employ a fluid bed process, the particles require maximum attrition resistance. Consequently, a high concentration of the metal oxide-aluminate phase may be required. Conversely, in fixed bed applications, the attrition resistance of the sorbent particles are relatively less important—while the overall sulfur sorption capacity is relatively more important.

It might also be noted here that, for purposes of this patent disclosure, the term(s) "particle(s)" will be employed to describe any one of, or all of, the extrudate, granule, microsphere, powder, particle, pellet or bead forms of the compositions of this patent disclosure. These particles also may contain minor amounts (e.g., less than twenty weight percent) of other auxiliary ingredients such as other binder materials (i.e., other than the metal oxide-aluminate phase), fillers, fluxes, surfactants and gas evolution agents.

In some cases, the resulting metal oxide-aluminate phase component of applicant's overall zinc titanate phase/metal oxide-aluminate phase compositions may have some capacity to remove reduced sulfur gases in its own right, while in other cases, the resulting metal oxide-aluminate phase will possess no reduced sulfur gas sorption capabilities whatsoever. In either case, however, the resulting zinc titanate phase/metal oxide-aluminate phase, sulfur sorbent, compositions of this parent disclosure will have improved reduced sulfur sorbent capabilities relative to those prior art compositions comprised of similar concentrations of zinc titanate and unreacted alumina that exist as a mixture of zinc titanate and a mixture of metal oxide (e.g., MgO) and alumina ($Al_2O_3$) that have not been chemically reacted.

Indeed, the properties (chemical as well as physical) of applicant's reduced sulfur gas sorbents compare very favorably to a wide variety of sulfur sorbent compositions prepared by various prior art methods. For example, applicant has established that the sulfur sorbent compositions of this patent disclosure have better reduced sulfur gas activities and attrition characteristics relative to those based upon the use of (1) binderless zinc titanate compositions, (2) compositions comprised of zinc titanate and unreacted alumina mixtures and (3) compositions based upon the combined use of zinc titanate and other commonly used inorganic binder materials such as kaolin and bentonite.

Another extremely important aspect of the present invention is the fact that applicant's zinc titanate/metal oxide-aluminate phase compositions will actually improve in their activity toward reduced sulfur gas species over repeated cycles of use. This behavior with respect to the effects of regeneration upon applicant's reduced sulfur capturing compositions stands in stark contrast to the fact that, under otherwise comparable conditions, repeated cycling of all prior art compositions known to applicant (such as those based upon the use of mixtures of zinc titanate and unreacted alumina) leads to their early, accelerating and very significant deactivation with respect to their ability to pick up reduced sulfur gases. The reason why applicant's compositions actually become better reduced sulfur-capturing agents upon repeated use is not fully understood; however, applicant believes this phenomenon may be due to certain synergistic effects between the zinc titanate and the metal oxide-aluminate phase that take place upon successive sorption/regeneration cycles. Indeed, this improvement in reduced sulfur gas sorbing ability may be taken as some evidence that a chemical reaction has been carried out between applicant's metal oxide and alumina ingredients. In improved reduced sulfur gas-capturing ability over success use also may be due, at least in part, to increased "activation" of the zinc titanate or metal-oxide aluminate phase with successive sorption/regeneration cycles, One experimental result supporting the latter view was applicant's repeated observation of an increase in overall surface area of such compositions following multiple sorption/regeneration cycles. Those skilled in this art will appreciate that an increase in the surface area of such a sulfur sorbent particle may serve to increase its reduced sulfur gas sorbent capabilities. Some additional experimental data (e.g., XRD traces for the zinc titanate component of these compositions) also suggests that a decrease in the crystalline sizes of the zinc titanate is taking place. This too, may play some role in the improved sulfur-capturing ability of applicant's compositions as they are repeatedly used.

Applicant believes that the reason(s) for the relatively faster and more severe chemical deactivation of those prior art zinc titanate sorbents used in conjunction with an unreacted alumina that is used as the zinc titanate's binder material can be summarized by the following generalized reactions:

TABLE IA

Zinc Titanate Compositions Only

| Sorption | $ZT + H_2S$ | → | $ZnS + TiO_2 + H_2O$ |
|---|---|---|---|
| Regeneration | $ZnS + TiO_2 + O_2$ | → | $ZT + SO_2$ |

TABLE IB

Zinc Titanate + Alumina Binder

| Sorption | $ZT + Al_2O_3 + H_2S$ | → | $ZnS + TiO_2 + Al_2O_3 + H_2O$ |
|---|---|---|---|
| Regeneration | $ZnS + TiO_2 + Al_2O_3 + O_2$ | → | $ZT + ZA + TiO_2 + SO_2$ |

In these tables, ZT represents a zinc titanate phase and ZA represents a zinc aluminate phase. Again, a ZT phase material made and employed according to the scheme of Table IA is generally characterized by both a relatively high reactivity toward reduced sulfur gas species and by a relatively low degree of toughness and attrition resistance. Conversely, those prior art $ZT+Al_2O_3$, compositions depicted in the chemical reaction scheme of Table IB are generally characterized by their relatively greater toughness and attrition resistance, but relatively lower chemical activity toward reduced sulfur gas species—especially over repeated cycles of use (relative to the materials depicted in Table IA). By way of contrast, applicant believes that the chemical reaction mechanism of the compositions of the present patent disclosure (as they undergo chemical reaction with a reduced sulfur-containing gas species such as $H_2S$) can be generally described by the reaction schemes depicted in Table IIA and IIB.

In Table IIA, the metal oxide-aluminate component of such compositions is assumed to be is substantially inactive toward reduced sulfur gas species while in Table IIB, such a metal oxide-aluminate phase is assumed to be chemically active toward such reduced sulfur species.

TABLE IIA

Metal Aluminate Not Reactive

| Sorption | $ZT + MOA + H_2S$ | → | $ZnS + TiO_2 + MOA + H_2O$ |
|---|---|---|---|
| Regeneration | $ZnS + TiO_2 + MOA + O_2$ | → | $ZT + MOA + SO_2$ |

TABLE IIB

Metal Aluminate Reactive

| Sorption | $ZT + MOA + H_2S$ | $ZnS + MS + TiO_2 + Al_2O_3 + H_2O$ |
|---|---|---|
| Regeneration | $ZnS + TiO_2 + Al_2O_3 + O_2$ | $ZT + MOA + SO_2$ |

In these tables, ZT represents a zinc titanate phase, MS represents a metal sulfide phase and MOA represents a metal oxide-aluminate phase. In either case, however, no significant reduction in the ZT phase results following successive sorption/regeneration cycles. Hence, no zinc aluminate is formed. Consequently, the zinc titanate (ZT) phase is not "poisoned."

Next, it should be noted that the zinc titanate/metal oxide-aluminate phase compositions of this patent disclosure can be made by two general methods. The first general method involves pre-reacting a zinc-containing compound with a titanium-containing compound at a sufficient temperature to effect a transformation of the zinc and titanium containing species into a zinc titanate compound. The various techniques for doing this are well known to this art. Indeed, in each of the two general methods for making applicant's zinc titanate/metal oxide-aluminate compositions, the zinc titanate ingredient may be obtained from commercial sources.

In any case, applicant's first production method (A), starts with mixing zinc titanate and one or more metal oxide-aluminate phase compounds in the presence of various inorganic binders and one or more liquid binder solutions A zinc titanate phase/metal oxide-aluminate phase precursor composition resulting from such mixtures is then formed into desired shapes such as extrudates, microspheres, granules, pellets, powders, extrudates or powders. The resulting physical forms of these materials are then subjected to a temperature greater than about 300° C. for a time period of greater than about 1 minute to convert the precursor components into a zinc titanate/metal oxide-aluminate composition with the desired physical properties (e.g., toughness, attrition resistance, macroporosity and surface area). More preferably, however, the heating period will be from about 1 to about 2 hours (at temperatures ranging from about 300° C. to about 1200° C.). Alternatively, where the targeted process operates at sufficiently high temperatures to effect the desired chemical phase transformations, this heat treatment step may occur within the process reactor vessel itself.

In the second manufacturing method (B), a zinc-containing compound, an aluminum-containing compound (and especially an unreacted alumina-containing compound) and the metal oxide-containing compound are mixed with various liquids to form a slurry, paste, etc. The resulting composition is then formed into a desired shape (e.g., extrudates, microspheres, granules, pellets or powders. The resulting physical forms of these compositions are then subjected to a temperature greater than about 300° C. for a time period greater than 1 minute to convert the precursor components into the zinc titanate/metal oxide aluminate phase composition with the desired physical properties such as toughness, attrition resistance, macroporosity and surface area. Preferably, this heating period will be from about 1 to about 2 hours at temperatures ranging from about 300° C. to about 1300° C. Alternatively, where the process in which applicant's sulfur sorbents is to b used operates at sufficiently high reactor and/or regenerator temperatures (e.g., above about 300° C. to effect the desired chemical phase transformations, this heat treatment step, likewise, may occur within the process reactor vessel itself.

These two production methods A and B, can be carried using the following generalized step-by-step procedures:

---

Method A.

a) Pre-react a zinc containing compound with a titanium-containing compound at sufficient temperature to effect a transformation of the Zn and Ti containing species into a zinc titanate compound.
b) Combine the zinc titanate compound prepared in Step 1 with a metal-containing compound and an aluminum-containing compound.
c) Form the material resulting from step (b) into a desired shape such as extrudates, microspheres, granules, pellets, powder.
d) Heat the resulting formed material to a temperature >300° C. for a time of greater than 1 minute.

Method B.

a) Combine a zinc containing compound, an aluminum containing compound and a metal oxide containing compound to form a slurry, paste, etc.
b) Form the material resulting from step (b) into a desired shape such as extrudates, microspheres, granules, pellets, powder.
c) Heat the resulting formed material to a temperature >300° C. for a time of greater than 1 minute.

---

It also should be noted that either of these two general methods A and B can include the use of minor amounts (e.g., less than about 20%) of other components such as binders, fluxes, surfactants and gas evolution agents. These compositions can also include other minor components and especially those used to assist in the regeneration of the sorbed, reduced sulfur gas species. For example, such compositions may include compounds containing Ni, Co, Mo, Cn, Tn, Mn, Fe, V, Cu and combinations thereof. These other minor components also can be added to the resulting composition (e.g., by impregnation or spraying particles of such compositions), or they can be employed by their inclusion in the respective starting ingredient formulations.

Thus, in general terms applicant has discovered a process for removing a reduced sulfur gas from a process stream wherein said process comprises contacting a process stream with a reduced sulfur gas sorbing composition comprising, in the same particle, a zinc titanate phase and a metal oxide-aluminate phase in order to remove at least a portion of the reduced sulfur gas from the process stream. The metal oxide-aluminate phase of applicant's sulfur sorbing compositions have the general formula MO wherein M is preferably a metal selected from the group consisting of magnesium, zinc, nickel and calcium and O is oxygen. For example, the metal oxide-aluminate phase may be zinc oxide-aluminate, calcium oxide-aluminate, magnesium oxide-aluminate, and so on. Indeed, this metal may be selected from a wide variety of divalent and/or trivalent metals.

In some preferred embodiments of this invention, the reduced sulfur gas composition, after sorption of a reduced sulfur gas, is regenerated by contacting it with an oxygen-containing gas (such as air) at an elevated temperature, in order to desorb the reduced sulfur species and thereby regenerate the sulfur sorbing composition for subsequent reduced sulfur gas sorption duty. Preferably, the reduced sulfur gas sorbing composition has a weight ratio of zinc titanate to metal oxide-aluminate phase ranging between about 5:80 and about 95:20.

These sulfur sorbent compositions may be prepared from a zinc titanate ingredient and at least one metal oxide-aluminate having the general formula MAlO, where M is a metal selected from the group consisting of magnesium, zinc, nickel and calcium, Al is aluminum, O is oxygen and where the zinc titanate ingredient and metal oxide-aluminate ingredient are in weight ratios of from about 5:80 to about 95:20. Such compositions may further comprises an inorganic binder in an amount such that it constitutes from about 2.0 to about 15.0 weight percent of the composition. Preferably such inorganic binder(s) will be selected from the group consisting of finely-sized bentonite, kaolinite, forsterite, vermiculite, feldspar, Portland cement, oil shale, calcium sulfate and mixtures thereof.

These compositions may be made by two general processes. The first process generally involves: (a) pre-reacting a zinc containing compound with a titanium-containing compound at sufficient temperature to effect a transformation of zinc and titanium-containing ingredients into a zinc titanate compound; (b) combining the zinc titanate compound prepared in Step (a) with a metal oxide-containing compound and a aluminum-containing compound; (c) forming the zinc titanate/metal oxide aluminate composition created by step (b) into a desired shape such as extrudates, Microspheres, granules, pellets, powder; and (d) heating shaped particles created by step (c) to a temperature greater than about 300° C. for a time of greater than one minute. In the alternative the zinc titanate compound may be obtained from commercial sources.

Applicant's second general process generally involves: (a) combining a zinc-containing compound, a aluminum-containing compound, a titanium-containing compound and a metal oxide-containing compound to form a slurry, past, etc.; (b) forming the resulting zinc titanate/metal oxide-aluminate precursor material into a desired shaped; and (c) heating the resulting shaped material to a temperature greater than about 300° C. for a time of greater than one minute.

In some of the more preferred embodiments of this invention, the use of applicant's compositions may be improved through such measures as (1) constantly recirculating the composition in a fluid bed reactor to effect sorption of the reduced sulfur gas, (2) extracting a portion of partially sorbed particles and subjecting them to a regeneration step and (3) regeneration of the composition by ceasing a gas flow in said process and then subjecting the sorbent composition to a regeneration step.

DETAILED DESCRIPTION OF EXPERIMENTAL WORK AND PREFERRED EMBODIMENTS

Figure 1:
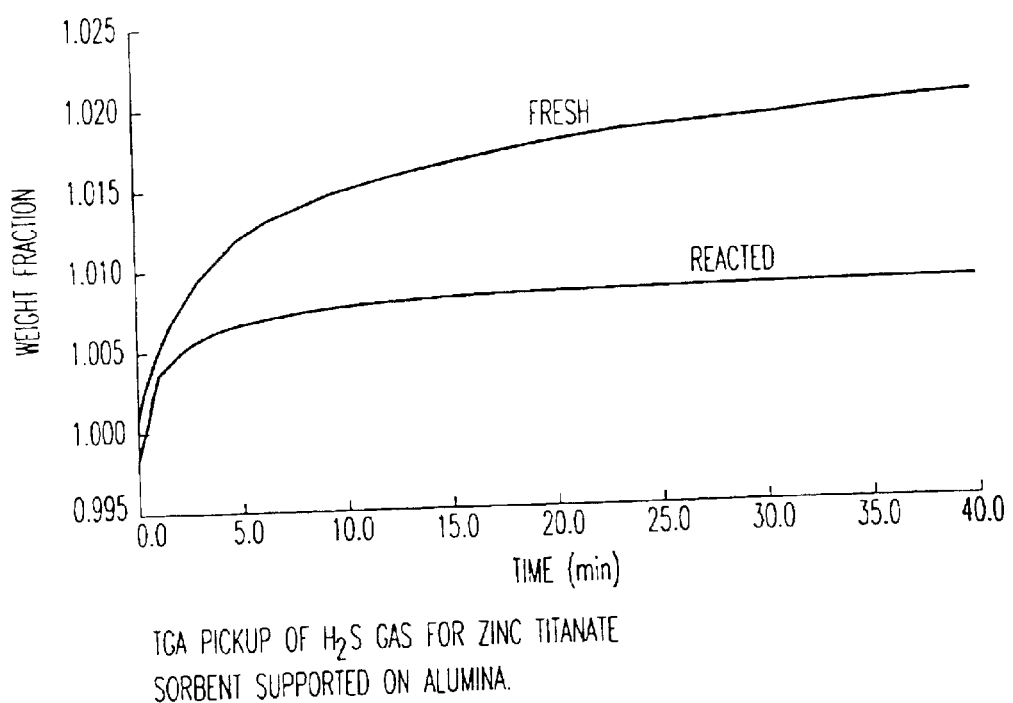
FIG. 1 depicts, by Thermogravimetric Analysis (TGA) traces, the hydrogen sulfide sorption ability of a prior art composition comprised of a zinc titanate sorbent supported by an unreacted alumina binder. The TGA traces for both a fresh sample and a reacted sample of the sorbent compositions are given for comparative purposes.

FIG. 1 shows the thermogravimetric analysis ("TGA") sorption capacity of a prior art zinc titanate/unreacted alumina sorbent before and after multiple cycles in a bench scale high temperature, high pressure (HTHP) reactor unit. As can be readily seen in FIG. 1, after such multi-cycle testing, the performance of the "reacted" prior art sorbent is degraded by about a factor of two.

Figure 2:
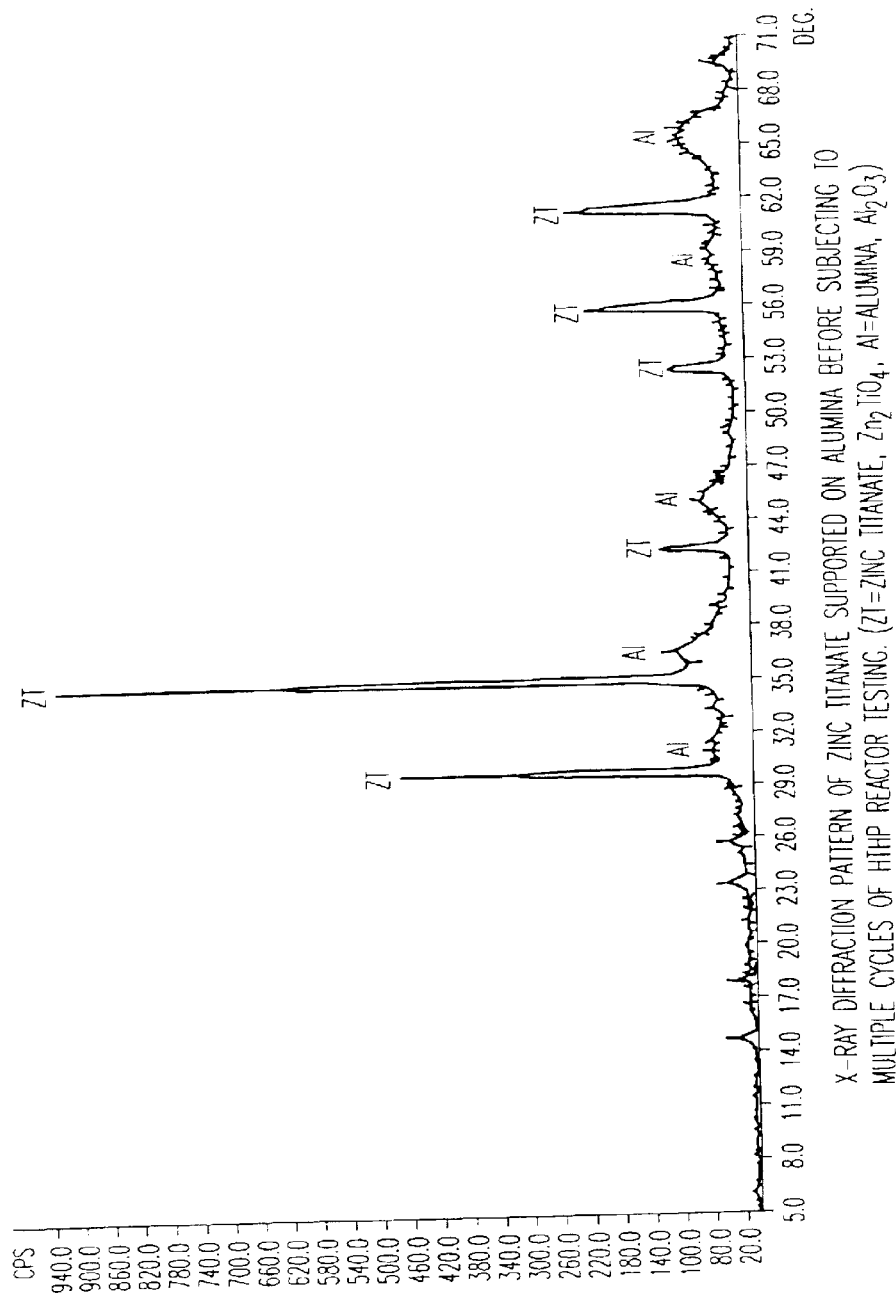
FIG. 2 shows the x-ray diffraction pattern of a composition comprised of a zinc titanate ingredient that is supported by an unreacted alumina binder material before said composition was subjected to multiple sorption/regeneration cycles in a high temperature, high pressure (HTHP) reactor.
Figure 3:
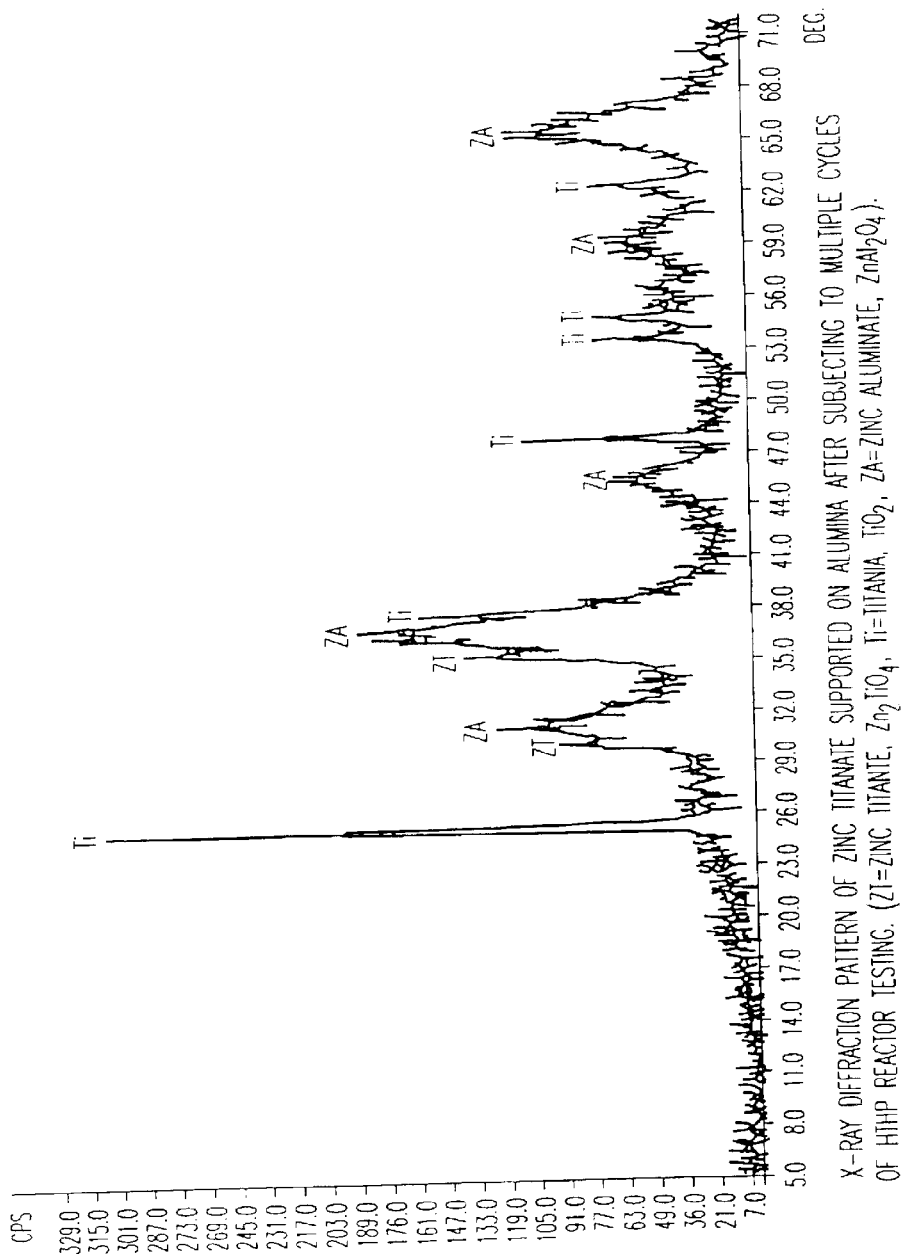
FIG. 3 shows the x-ray diffraction pattern of zinc titanate supported by an unreacted alumina binder composition whose XRD pattern is shown in FIG. 2, after this composition was subjected to multiple cycles of HTHP reactor testing.

FIG. 2 depicts an x-ray diffraction pattern generated by a sample of a zinc titanate/unreacted alumina composition before multi-cycle HTHP testing. This x-ray diffraction pattern indicates that, prior to testing, the sample contained zinc titanate and alumina. By way of comparison, FIG. 3 depicts the XRD pattern of the FIG. 2 sample material after it was HTHP tested. FIG. 3 shows a significant reduction in the original zinc titanate phase. This was accompanied by a corresponding increase in a zinc aluminate phase and a titanium dioxide phase.

Given these findings, the present invention also may be thought of as a method of stabilizing unreacted alumina binders in order to render them chemically inactive toward chemical reaction with those zinc atoms that emanate from, a zinc-containing compound such as a zinc titanate component of such sulfur sorbent compositions under the high temperature conditions existing in those processes Where these compositions are typically employed. Thus, applicant's invention also may be thought of as a "stabilization agent" comprised of a metal oxide (which will usually, but not necessarily, be a divalent metal such as $Mg^{2+}$, $Ca^{2+}$, $Zn^{2+}$, etc.) which is chemically reacted with alumina to form a metal oxide-aluminate phase material. As a result of this metal oxide-aluminate phase forming chemical reaction, deactivation of the zinc titanate ingredient of the reduced sulfur sorbent composition can be eliminated or, at the very least, greatly decreased.

Figure 4:
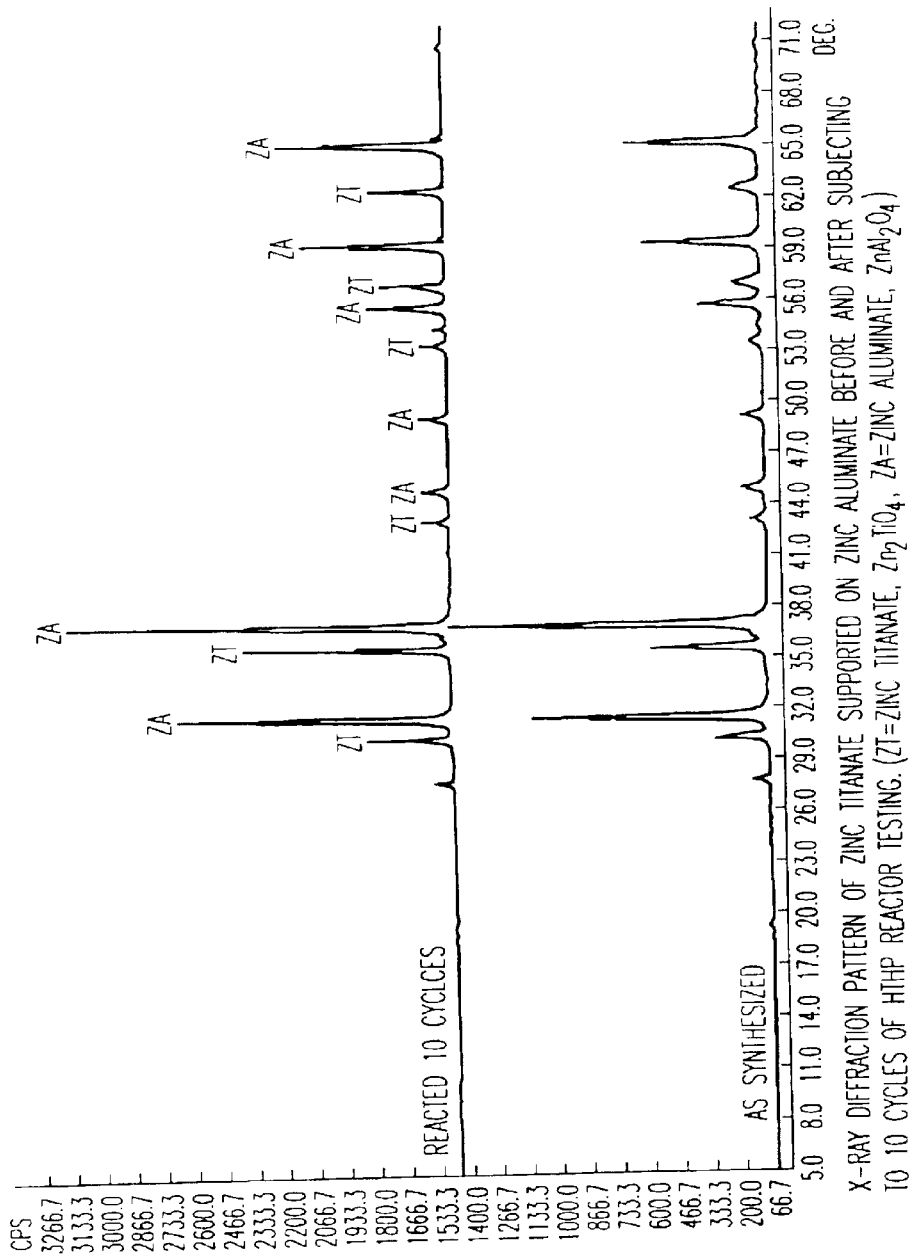
FIG. 4 shows the x-ray diffraction pattern of a composition comprised of zinc titanate supported by zinc aluminate. The traces for the materials are shown before and after it was subjected to 10 cycles of HTHP reactor testing.
Figure 5:
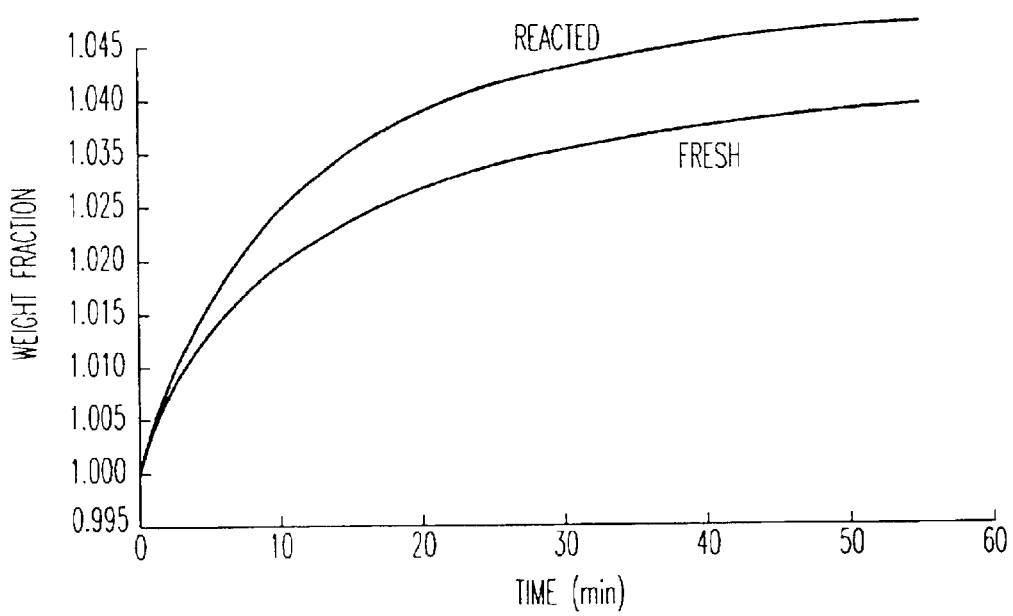
FIG. 5 shows the thermogravimetric analysis (TGA) pickup trace of the $H_2S$ gas pickup ability of a composition comprised of zinc titanate sorbent supported by a zinc oxide-aluminate phase material. The traces for both fresh and reacted forms of this composition are given for comparative purposes.

Applicant's XRD analysis of various samples that were subjected to HTHP testing shows that the zinc titanate phase of an overall zinc titanate/metal oxide-aluminate phase composition was essentially unchanged with repeated cycles of pick up and release of reduced sulfur gases (for example, compare the "before and after" graphs of FIG. 4). Consequently, the activity of the overall sorbent composition (comprised of zinc titanate, metal oxide-aluminate, binder, etc.) does not degrade with multiple sorption/regeneration cycles. This phenomenon also is clearly shown by the TGA traces of FIG. 5. In fact, FIG. 5 shows that the reduced sulfur capturing activity of this zinc titanate/metal oxide-aluminate composition actually improved with repeated HTHP cycling. Again, this is the very opposite behavior to that displayed by the zinc unreacted/unreacted alumina composition that generated the TGA trace shown in FIG. 1. As previously noted, the increase in reduced sulfur sorbent activity after repeated cycles of use that is exhibited by applicant's reduced sulfur sorbent composition is believed to result, at least in part, from the fact that no degradation of the zinc titanate phase by the mechanism described above has taken place.

Moreover, an increase in surface area in these materials was observed. It also should be noted that increased line broadening of the XRD trace of the zinc titanate component strongly indicate that a decreased crystallite size of the zinc titanate phase may be brought about by successive sorption/regeneration cycles. The result of this decrease in crystallite size of the zinc titanate phase may well explain the increase in sorption activity. Another possible factor in the improved reduced sulfur gas pickup ability of the hereindescribed compositions may be reduced sulfur sorption by the metal oxide component of the metal oxide-aluminate compounds in these compositions. Regardless of the chemical mechanism(s) that produce these phenomena, the fact remains that applicant's zinc titanate/metal oxide-aluminate phase compositions represent a very significant advance in the art of capturing reduced sulfur gases.

Description of Test Equipment

Two pieces of equipment were used to determine the ability of a given sorbent to sorb $H_2S$ species—and then to release the sorbed species as $SO_2$. This sorption and release constitutes one cycle of a test. The first piece of equipment was a high temperature, high pressure (HTHP) bench reactor which is, in effect, a bench-scale fixed fluidized bed reactor unit that has the capability to vary the temperature, pressure and atmosphere of the reactor over a given series of test cycles. At the end of a given cyclic test, the subject sulfur sorbent materials were removed from the reactor and subjected to a thermogravimetric analysis (TGA) test to determine the amount of deactivation experienced by the subject material as a result of the cyclic testing.

The TGA test was performed on a Dupont 1090 Thermal analysis system at constant temperature and at atmospheric pressure. The TGA technique, as described herein, measures a change in weight of a sample as a sorbent gas is passed into the reaction chamber containing the sample. A test gas, composed of $H_2S$ and nitrogen, was used in these studies and the sample mass increased as the subject sulfur sorbent material reacts with the $H_2S$ gas to form zinc sulfides. Such tests were performed for about 30–50 minutes at which point introduction of the $H_2S$-containing gas was discontinued.

The x-ray diffraction tests used by applicant were performed on both fresh and HTHP unit-reacted materials using a Scintag XDS-2000 theta-theta XRD unit with copper $K\alpha$ radiation. Scans were performed over the two-theta range of 5 to 72°.

Applicant's attrition testing was performed on a 3-hole air-jet test unit. Such testing is fully compliant with the ASTM standard D5757. The values reported in this patent disclosure are the loss per hour during hour two of the test. The experimental results from the first hour were discarded since this part of the test produces a material that generally contains a great many fine particles which were not produced as a result of attrition of the sorbent material, but are merely present due to the original particle size distribution of the particles being tested. For harsh environments, such as those extant in circulating fluid bed processes, i.e., IGCC (integrated gasification combined cycle), hot-gas desulfurization, FCC, etc., acceptable attrition resistance values range from about 0.1 to about 12. For further reference, a typical equilibrium catalyst (ECAT) from a FCC unit measures in the range of 0.2–0.6 by the above attrition test method.

Formulation Methods

The formulation methods employed by applicant generally involved first pre-reacting a zinc oxide component with a titanium oxide component and heat treating the resulting mixture such that the desired zinc titanate phase was produced. Obviously, a commercial source of zinc titanate could have been utilized as well. Be that as it may, the finished zinc titanate phase was then incorporated into a binder material and formed into a desired shape. If the zinc oxide, titanium oxide and alumina were all mixed and reacted to temperatures sufficient to convert the zinc oxide and titanium oxide to the desired zinc titanate phase a zinc oxide-aluminate phase would invariably for along with the zinc titanate phase.

In the practice of applicant's invention, however, it is also possible to form a zinc titanate/metal oxide-aluminate phase composition by a one-step process, without any deleterious effect on the formation of the zinc titanate phase. Applicant prepared zinc titanate/zinc oxide aluminate compounds via this "one step" formulation process. The procedure is found in Example 5 of this patent disclosure. Following calcination at 950° C. for 2 hours, x-ray diffraction analysis was performed on the resulting materials. This x-ray diffraction testing confirmed that the only phases present were zinc titanate and zinc oxide-aluminate. The success of such one step formulations may be somewhat more dependent (relative to applicant's other formulation methods) on the proportions of the starting ingredients being as close to the stoichiometric proportions as possible (i.e., it is preferred that there be no excess alumina, zinc oxide or metal oxide). This same result was found for a two-step process such as the one described in Example 4. The aforementioned one-step process not only results in an easier overall manufacturing process, but also results in more attrition resistant and dense particles relative to those made by applicant's two-step process. Applicant's tests also involved systematic comparisons between counterpart compositions prepared by applicant's one-step process and two-step process.

EXAMPLE 1

A zinc titanate compound containing no binder material was produced by mixing 2637 grams of water, 548 grams of zinc oxide (Zinc Corporation of America, Grade: KADOX 911) and 359 grams of titanium oxide (Dupont, Grade: TI-PURE R-900) in a container under strong shear conditions. The resulting slurry was spray dried to form microspheroidal particles. The resulting particles were then heated treated at 900° C. for two hours. X-ray diffraction analysis confirmed zinc titanate was only phase present in such particles.

EXAMPLE 2

A zinc titanate compound containing 3 weight percent bentonite binder was produced by mixing 2637 grams of water, 532 grams of zinc oxide (Zinc Corporation of America, Grade: KADOX 911), 348 grams of titanium oxide (Dupont, Grade: TI-PURE R-900) and 27.2 grams of Bentonite in a container under strong shear conditions. The resulting slurry was spray dried to form microspheroidal particles. The resulting particles were then heated treated at 900° C. for two hours. X-ray diffraction analysis confirmed zinc titanate was formed in such particles.

EXAMPLE 3

A zinc titanate-containing composition containing alumina as the binder was made by first preparing a zinc titanate compound as in Example 1. This zinc titanate was then reduced to an average particle size of about 2.5 micrometers. In a separate container, a 12% solids slurry of hydratable alumina (CONDEA; PLURAL SB) was prepared by slurrying 499 grams of alumina in 1895 grams of water under high shear conditions. To this slurry, 25 grams of formic acid were added and agitated unit alumina became gelled. The gelled alumina was then combined with the zinc titanate and water such that the amount of zinc titanate contained in the finished product was 30 weight percent. The slurry was then spray dried at 13% solids to form microspheroidal particles which were then heat treated at 700° C. for one hour.

EXAMPLE 4

A zinc titanate/zinc oxide aluminate phase composition was made by first preparing the zinc titanate compound as in Example 1. The zinc titanate was then reduced in particle size to an average particle size of about 2.5 micrometers. In a separate container, a 12 weight percent solids alumina sol was prepared by dispersing under high shear conditions 544.3 grams of (CONDEA: Grade: DISPERAL P3) alumina in 2379 grams of water containing 25.3 grams acetic acid. The zinc titanate, alumina sol and zinc oxide (Zinc Corporation of America, Grade: KADOX 911) were combined in water such that the zinc titanate concentration in the finished product was 30 weight percent and the zinc aluminate was prepared at a 0.5 Zn/Al ratio. The resulting slurry was spray dried at 13% solids to form microspheroidal particles which were then heat treated at 950° C. for two hours.

EXAMPLE 5

A zinc titanate-zinc aluminate composition was prepared in a single-step process by combining zinc oxide (Zinc Corporation of America, Grade: KADOX 911), alumina sol (prepared as in Example 4), and titanium oxide (Dupont, Grade: TI-PURE R-900) such that a slurry is formed. The zinc oxide, alumina sol and titanium oxide were formulated such that the zinc titanate concentration in the finished product was 30 weight percent and the zinc aluminate was prepared at a 0.5 Zn/Al ratio. The slurry was then spray dried at 13% solids to form microspheroidal particles which were then heat treated at 950° C. for two hours. X-ray diffraction confirmed that zinc titanate and zinc aluminate were the only phases present.

EXAMPLE 6

A zinc titanate-calcium aluminate composition was prepared by mixing in a container water, calcium carbonate, zinc titanate (prepared as in Example 1) and alumina sol (prepared as in Example 4) The zinc oxide, alumina sol and calcium carbonate were formulated such that the zinc titanate concentration in the finished product was 30 weight percent and the calcium aluminate was prepared at a 0.5 Ca/Al ratio. The slurry was then spray dried to form microspheroidal particles which were then heat treated at 700° C. for two hours.

EXAMPLE 7

A zinc titanate-magnesium aluminate composition was prepared by mixing water, magnesium acetate solution (Fisher Chemical), zinc titanate (prepared as in Example 1) and alumina sol (prepared as in Example 4). The zinc titanate, alumina sol and magnesium acetate were formulated such that the zinc titanate concentration in the finished product was weight percent and the magnesium aluminate was prepared at a 0.5 Mg/Al ratio. The slurry was then spray dried to form microspheroidal particles which were then heat treated at 700° C. for two hours.

EXAMPLE 8

A zinc titanate-zinc aluminate composition was prepared in a single-step process by combining water, zinc oxide, alumina sol (prepared as in Example 4), and titanium oxide such that a slurry is formed. The zinc oxide (Zinc Corporation of America, Grade: Kadox 911), alumina sol and titanium oxide (Dupont, Grade: TiPure R-900) were formulated such that the zinc titanate concentration in the finished product was 40 weight percent and the zinc aluminate was prepared at a 0.5 Zn/Al ratio. The slurry was then spray dried at 13% solids to form microspheroidal particles which were then heat treated at 900° C. for 1.5 hours. X-ray diffraction confirmed that zinc titanate and zinc aluminate were the only phases present.

EXAMPLE 9

A zinc titanate-zinc aluminate composition was prepared in a single-step process by combining water, zinc oxide (Zinc corporation of America, Grade; Kadox 911), alumina sol (prepared as in Example 4), and titanium oxide (Dupont, Grade: TiPure R-900) such that a slurry is formed. The zinc oxide, alumina sol and titanium oxide were formulated such that the zinc titanate concentration is in the finished product was 50 weight percent and the zinc aluminate was prepared at a 0.5 Zn/Al ratio. The slurry was hen spray dried at 13% solids to form microspheroidal particles which were then heat treated at 900° C. for 1.5 hours. X-ray diffraction confirmed that zinc titanate and zinc aluminate were the only phases present.

EXAMPLE 10

A zinc titanate-zinc aluminate composition was prepared in a single-step process by combining water, zinc oxide (Zinc Corporation of America, Grade: Kadox 911), alumina sol (prepared as in Example 4), and titanium oxide ( Dupont, Grade: TiPure R-900) such that a slurry is formed. The zinc oxide, alumina so and titanium oxide were formulated such that the zinc titanate concentration in the finished product was 60 weight percent and the zinc aluminate was prepared at a 0.5 Zn/Al ratio. The slurry was then spray dried at 13% solids to form microspheroidal particles which were then heat treated at 900° C. for 1.5 hours. X-ray diffraction confirmed that zinc titanate and zinc aluminate were the only phases present.

EXAMPLE 11

A zinc titanate/zinc aluminate phase composition was prepared in a single-step process by combining water, zinc oxide (Zinc Corporation of America, Grade: Kadox 911), alumina sol (prepared as in Example 4), and titanium oxide (Dupont, Grade: TiPure R-900) such that a slurry is formed. The zinc oxide, alumina sol and titanium oxide were formulated such that the zinc titanate concentration in the finished product was 60 weight percent and the zinc aluminate was prepared at a 0.5 Zn/Al ratio. The slurry was then spray dried at 13% solids to form microspheroidal particles which were then heat treated at 900° C. for 1.5 hours. X-ray diffraction confirmed that zinc titanate and zinc aluminate were the only phases present.

Comparative Tests

Examples of certain physical and chemical properties of representative zinc titanate-containing particles described in the prior art are given in Table III.

TABLE III

|  | Example 1 6036A | Example 2 6036B | Example 3 6072C |
|---|---|---|---|
| Active Component | Zinc Titanate | Zinc Titanate | Zinc Titanate |
| Support/Binder | None | Bentonite | Alumina |
| Attrition Resistance, % loss/hr. | >25 | >25 | 4.5 |
| Apparent Bulk Density, g/cc | 0.86 | 0.86 | 0.64 |
| Surface Area, m²g | 3.6 | 3.2 | 150 |
| XRD Phase | ZT | ZT | ZT + Alumina |

Examples of certain physical properties of zinc titanate-containing compositions described in the present invention are given in Table IV.

TABLE IV

|  | Example 4 6147D2 | Example 7 6036B | Example 6 6072C |
|---|---|---|---|
| Active Component | Zinc Titanate | Zinc Titanate | Zinc Titanate |
| Support/Binder | Zinc Aluminate | Magnesium Aluminate | Calcium Aluminate |
| Attrition Resistance, % loss/hr. | 3.2 | 4.3 | 3.0 |
| Apparent Bulk Density, g/cc | 0.76 | 0.63 | 0.66 |
| Surface Area, m²g | 26 | 163 | 124 |
| XRD Phase | ZT + ZA | ZT + MA | ZT + CA |

Comparison of properties of compositions made by the one-step and two-step method of manufacture of the zinc titanate/metal oxide-aluminate materials of this patent disclosure are summarized in Table V.

TABLE V

|  | Example 4 6147D2 | Example 5 7003A |
|---|---|---|
| Process Technique | Two-Step | One-Step |
| Attrition Resistance, % loss/hr. | 3.2 | 1.3 |
| Apparent Bulk Density, g/cc | 0.76 | 1.4 |
| Surface Area, m²g | 26 | 11 |
| XRD Phase | ZT + ZA | ZT + ZA |

Comparison of properties of compositions made by the one-step method of manufacture with increasing amounts of zinc titanate in the composition are summarized in Table VI.

TABLE VI

|  | Example No ID | | | |
|---|---|---|---|---|
|  | 5 7003A | 8 | 9 | 10 |
| Zinc Titanate | 30% | 40% | 50% | 60% |
| Attrition Resistance, % loss/hr. | 1.3 | 3.2 | 5.2 | 11 |
| Apparent Bulk Density, g/cc | 1.4 | 1.4 | 1.4 | 1.4 |
| Surface Area, m²g | 11 | 13 | 12 | 11 |
| XRD Phase | ZT + ZA | ZT + ZA | ZT + ZA | ZT + ZA |

While applicant's invention has been described with respect to various theories, specific examples and a spirit which is committed to the concept of use of zinc titanate phase material and metal oxide-aluminate phase material in the same particle as a reduced sulfur sorbent, and wherein the occurrence of a chemical reaction between a metal oxide ingredient and an alumina ingredient to produce the metal oxide-aluminate phase material, the full scope of this invention is limited only by the patent claims which follow.

What is claimed is:

1. An attrition resistant, particulate sorbent for removing a reduced sulfur species from a feed stream comprising a plurality of substantially uniform particles, said substantially uniform particles comprising;

a multiphase composition comprising a zinc titanate phase and a zinc oxide-aluminate phase, said zinc titanate phase being present in an amount of from about 5 wt. % to about 80 wt. % of said particles, said zinc oxide-aluminate phase being present in an amount of from about 20 wt. % to about 95 wt. % of said particles, said zinc titanate and zinc oxide-aluminate phases constituting at least about 80 wt. % of said particles; and said particles being substantially free of unreacted alumina and having a surface area of about 1 to about 300 m$^2$/g.

2. The attrition resistant, particulate sorbent of claim 1, wherein said zinc oxide-aluminate phase constitutes at least about 40 wt. % of said particles.

3. The attrition resistant, particulate sorbent of claim 2, wherein said zinc oxide-aluminate phase constitutes a support for said zinc titanate phase.

4. The attrition resistant, particulate sorbent of claim 2, wherein said zinc oxide-aluminate phase constitutes at least about 50 wt. % of said particles.

5. The attrition resistant, particulate sorbent of claim 3, further comprising an inorganic binder in an amount of from about 2.0 to about 15.0 weight percent of said particles.

6. The attrition resistant, particulate sorbent of claim 4, further comprising an inorganic binder in an amount of from about 2.0 to about 15.0 weight percent of said particles.

7. The attrition resistant, particulate sorbent of claim 5 wherein said inorganic binder is selected from the group consisting of bentonite, kaolinite, forsterite, vermiculite, feldspar, Portland cement, oil shale, calcium sulfate and mixtures thereof.

8. The attrition resistant, particulate sorbent of claim 6 wherein said inorganic binder is selected from the group consisting of bentonite, kaolinite, forsterite, vermiculite, feldspar, Portland cement, oil shale, calcium sulfate and mixtures thereof.

9. The attrition resistant, particulate sorbent of claim 2, wherein said particles are in the form of microspheroidal particles.

10. The attrition resistant, particulate sorbent of claim 4, wherein said particles are in the form of microspheroidal particles.

11. The attrition resistant, particulate sorbent of claim 2, said particles having been formed by the process comprising;

combining a zinc-containing compound, an aluminum-containing compound, and titanium-containing compound to form a zinc titanate, zinc oxide-aluminate precursor material;

forming the zinc titanate, zinc oxide-aluminate precursor material into a shaped material comprising shaped particles; and heating the shaped material to a temperature and for a time sufficient to react said compounds in said precursor material to form said zinc titanate and zinc oxide-aluminate phases.

12. The attrition resistant, particulate sorbent of claim 4, said particles having been formed by the process comprising;

combining a zinc-containing compound, an aluminum-containing compound, and a titanium-containing compound to form a zinc titanate, zinc oxide-aluminate precursor material;

forming the zinc titanate, zinc oxide-aluminate precursor material into a shaped material comprising shaped particles; and heating the shaped material to a temperature and for a time sufficient to react said compounds in said precursor material to form said zinc titanate and zinc oxide-aluminate phases.

13. The attrition resistant, particulate sorbent of claim 11, wherein said shaped particles are in the form of microspheroidal particles.

14. The attrition resistant, particulate sorbent of claim 12, wherein said shaped particles are in the form of microspheroidal particles.

15. The attrition resistant, particulate sorbent of claim 2, wherein said particles have an attrition resistance, measured by a three hole air jet test unit in accordance with ASTM Standard D5757 during the second hour of testing, of between 0.1 and 12% loss/hr.

16. The attrition resistant, particulate sorbent of claim 4, wherein said particles have an attrition resistance, measured by a three hole air jet test unit in accordance with ASTM Standard D5757 during the second hour of testing, of between 0.1 and 12% loss/hr.

17. The attrition resistant, particulate sorbent of claim 11, wherein said particles have an attrition resistance, measured by a three hole air jet test unit in accordance with ASTM Standard D5757 during the second hour of testing, of between 0.1 and 12% loss/hr.

18. The attrition resistant, particulate sorbent of claim 12, wherein said particles have an attrition resistance, measured by a three hole air jet test unit in accordance with ASTM Standard D5757 during the second hour of testing, of between 0.1 and 12% loss/hr.

19. The attrition resistant, particulate sorbent of claim 2 wherein said particles have a particle density substantially greater than that of particles formed of a composition comprising zinc titanate and unreacted alumina phases in amounts substantially the same as the zinc titanate and zinc oxide-alumina phases in said particles.

20. The attrition resistant, particulate sorbent of claim 4 wherein said particles have a particle density substantially greater than that of particles formed of a composition comprising zinc titanate and unreacted alumina phases in amounts substantially the same as the zinc titanate and zinc oxide-alumina phases in said particles.

21. The attrition resistant, particulate sorbent of claims 11 wherein said particles have a particle density substantially greater than that of particles formed of a composition comprising zinc titanate and unreacted alumina phases in amounts substantially the same as the zinc titanate and zinc oxide-alumina phases in said particles.

22. The attrition resistant, particulate sorbent of claim 12 wherein said particles have a particle density substantially greater than that of particles formed of a composition comprising zinc titanate and unreacted alumina phases in amounts substantially the same as the zinc titanate and zinc oxide-alumina phases in said particles.

23. A process of preparing an attrition resistant, particulate sorbent for removing a reduced sulfur species from a feed stream comprising:

combining a zinc-containing compound, an aluminum-containing compound, and a titanium-containing compound to form a zinc titanate, zinc oxide-aluminate precursor material;

forming the zinc titanate, zinc oxide-aluminate precursor material into a shaped material comprising shaped particles; and heating the shaped material to a temperature and for a time sufficient to react said compounds in said precursor material to form a particulate sulfur sorbent comprising a multiphase composition, said composition comprising zinc titanate and zinc oxide-aluminate phases and being free of unreacted alumina.

24. The process of claim 23, wherein said zinc-containing compound comprises zinc oxide, said titanium-containing compound comprises titanium dioxide and said aluminum-containing compound comprises an alumina precursor.

25. The process of claim 23, wherein said zinc titanate phase is present in an amount of from about 5 wt. % to about 80 wt. %, said zinc oxide-aluminate phase is present in an amount of from about 20 wt. % to about 95 wt. %, and said zinc titanate and zinc oxide-aluminate phases constitute at least about 80 wt. % of said particulate sulfur sorbent particles, and wherein said particles have a surface area of about 1 to about 300 $m^2/g$.

26. The process of claim 25, wherein said zinc oxide-aluminate phase constitutes at least about 40 wt. % of said particles.

27. The process of claim 26, wherein said zinc oxide-aluminate phase comprises a support for said zinc titanate phase.

28. The process of claim 27, wherein said zinc oxide-aluminate phase constitutes at least about 50 wt. % of said particles.

29. The process of claim 25, wherein said shaped particles are in the form of microspheroidal particles.

30. The attrition resistant, particulate absorbent according to claim 1, wherein said particles are free of unreacted alumina.

* * * * *